US012769177B2

(12) United States Patent
West et al.

(10) Patent No.: US 12,769,177 B2
(45) Date of Patent: Oct. 20, 2026

(54) INTEGRATED DUAL-WAVEGUIDE ACOUSTO-OPTIC MODULATOR

(71) Applicant: Massachusetts Institute of Technology, Cambridge, MA (US)

(72) Inventors: Gavin West, Everett, MA (US); Rajeev J. Ram, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 277 days.

(21) Appl. No.: 18/570,953

(22) PCT Filed: Apr. 15, 2022

(86) PCT No.: PCT/US2022/025025
§ 371 (c)(1),
(2) Date: Dec. 15, 2023

(87) PCT Pub. No.: WO2022/265722
PCT Pub. Date: Dec. 22, 2022

(65) Prior Publication Data

US 2024/0369901 A1 Nov. 7, 2024

Related U.S. Application Data

(60) Provisional application No. 63/211,928, filed on Jun. 17, 2021.

(51) Int. Cl.
*G02F 1/335* (2006.01)
*G02F 1/125* (2006.01)

(52) U.S. Cl.
CPC .............. *G02F 1/335* (2013.01); *G02F 1/125* (2013.01); *G02F 2201/307* (2013.01)

(58) Field of Classification Search
CPC ................................ G02F 1/125; G02F 1/335
(Continued)

(56) References Cited

U.S. PATENT DOCUMENTS 3,753,157 A * 8/1973 Ash ..................... G02B 6/4259 385/9
4,092,060 A 5/1978 Nunoshita et al.
(Continued)

FOREIGN PATENT DOCUMENTS

JP 2-226233 A * 9/1990
JP 07270736 A 10/1995
JP 0869022 A 3/1996

OTHER PUBLICATIONS

Cai et al., "Acousto-optical modulation of thin film lithium niobate waveguide devices." Photonics Research 7.9 (2019): 1003-1013.
(Continued)

*Primary Examiner* — Michael Stahl
(74) *Attorney, Agent, or Firm* — Smith Baluch LLP

(57) ABSTRACT

An integrated acousto-optic modulator operates with an extremely high extinction ratio (e.g.,>50 dB) thanks to two widely separated two-dimensional (2D) waveguides. These 2D waveguides are formed on or adjacent to a one-dimensional (ID) wave-guide far enough apart (e.g., 10-100 pm apart) to prevent evanescent coupling between them. An acoustic transducer formed on the surface of the ID waveguide switches light from one 2D waveguide to the other 2D waveguide via the ID waveguide. The acoustic wave emitted by the acoustic transducer forms a traveling grating that overlaps with one 2D waveguide. diffracting light from that 2D waveguide into the ID waveguide, which guides the light to the other 2D waveguide. A lateral grating coupler diffracts this light from the ID waveguide into a mode guided by the other 2D waveguide. This acoustic modulator acts as a switch suitable for use in quantum and atomic systems.

16 Claims, 11 Drawing Sheets

(58) Field of Classification Search
USPC .............................................................. 385/7
See application file for complete search history.

(56) References Cited

U.S. PATENT DOCUMENTS

| | | | | |
|---|---|---|---|---|
| 4,433,895 | A * | 2/1984 | Puech ..................... | G02F 1/335 385/27 |
| 4,776,661 | A * | 10/1988 | Handa ................ | G02B 6/12004 385/24 |
| 4,991,923 | A | 2/1991 | Kino et al. | |
| 5,002,349 | A | 3/1991 | Cheung et al. | |
| 5,164,628 | A | 11/1992 | Egara et al. | |
| 5,367,216 | A | 11/1994 | Egara et al. | |
| 5,689,362 | A | 11/1997 | Kadota | |
| 5,841,913 | A | 11/1998 | Marcuse et al. | |
| 6,865,310 | B2 * | 3/2005 | Yokouchi ........... | G02B 6/12007 385/9 |
| 2005/0248826 | A1 * | 11/2005 | Tsarev .................... | G02F 1/125 359/285 |
| 2018/0284466 | A1 | 10/2018 | Moebius et al. | |

OTHER PUBLICATIONS

Chen et al., "A novel silica-waveguide acousto-optic frequency shifter using ZnO piezoelectric films and its beam propagation analysis." Optoelectronic Devices and Integration III. vol. 7847. International Society for Optics and Photonics, 2010. 9 pages.
Crespo-Poveda et al., "Optical waveguide devices modulated by surface acoustic waves." arXiv:1811.03051v1 [physics.app-ph] Nov. 7, 2018, 26 pages.
Dostart et al., "Integrated optical isolators using electrically driven acoustic waves." Optics Express 28.24 (2020): 36055-36069.
Ghosh et al., "Integrated piezoelectrically driven acousto-optic modulator." 2015 28th IEEE International Conference on Micro Electro Mechanical Systems (MEMS). IEEE, 2015. 4 pages.
Ghosh, "Piezoelectric Acousto-Optical Modulation in Aluminum Nitride for Integrated RF-Photonics," Ph.D. Thesis, Aug. 2015, 155 pages.
Hadij-Elhouati et al., "Distributed Bragg deflector coupler for on-chip shaping of optical beams." Optics Express 27.23 (2019): 33180-33193.
Hadij-Elhouati et al., "High-efficiency conversion from waveguide mode to an on-chip beam using a metamaterial engineered Bragg deflector." Optics Letters 46.10 (2021): 2409-2412.
Herrmann et al., "Tapered acoustical directional couplers for integrated acousto-optical mode converters with weighted coupling." Journal of Lightwave technology 13.3 (1995): 364-374.
International Search Report and Written Opinion in International Application No. PCT/US2022/025025 mailed Aug. 2, 2022, 15 pages.
Kakio et al., "An integrated acoustooptic frequency shifter driven by surface acoustic wave for 1.55 μm optical wavelength." Japanese Journal of Applied Physics 42.5S (2003): 3063. 4 pages.
Kakio et al., "Simple simultaneous modulation for red, green, and blue laser lights using surface-acoustic-wave-driven acoustooptic modulator." Japanese Journal of Applied Physics 49.7S (2010): 07HD18. 6 pages.
Kittlaus et al., "Electrically-driven Acousto-optics and Broadband Non-reciprocity in Silicon Photonics," arXiv:2004.01270v1 [physics.optics] Apr. 2, 2020, 26 pages.
Lee, "Optical-gyroscope application of efficient crossed-channel acoustooptic devices." Applied Physics B 35.2 (1984): 113-118.
Li et al., "Electromechanical Brillouin scattering in integrated planar photonics." APL Photonics 4.8 (2019): 080802. 9 pages.
Liu et al., "Electromechanical Brillouin scattering in integrated optomechanical waveguides." Optica 6.6 (2019): 778-785.
Poveda et al., "Optical waveguide devices modulated by surface acoustic waves." arXiv preprint arXiv:1811.03051 (2018). 25 pages.
Qaderi et al., "Leaky-mode waveguide modulators with high deflection angle for use in holographic video displays." Optics Express 24.18 (2016): 20831-20841.
Sarabalis et al., "Acousto-optic modulation in lithium niobate on sapphire," arXiv:2005.00916v1 [physics.optics] May 2, 2020, 8 pages.
Sarabalis et al., "Acousto-optic modulation of a wavelength-scale waveguide." arXiv preprint arXiv:2010.12517 (2020). 14 pages.
Schmidt et al., "Acousto-optic diffraction of guided optical waves in LiNbO3." Applied Physics Letters 23.8 (1973): 417-419.
Shao et al., "Integrated microwave acousto-optic frequency shifter on thin-film lithium niobate." arXiv preprint arXiv:2005.03794 (2020). 11 pages.
Shao et al., "Microwave-to-optical conversion using lithium niobate thin-film acoustic resonators." Optica 6.12 (2019): 1498-1505.
Tadesse et al., "Sub-optical wavelength acoustic wave modulation of integrated photonic resonators at microwave frequencies." Nature Communications 5.1 (2014): 1-7.
Tsai ed., Guided-wave acousto-optics: interactions, devices, and applications. vol. 23. Springer Science & Business Media, 2013. 330 pages.
Van Der Slot et al., "Surface acoustic waves for acousto-optic modulation in buried silicon nitride waveguides." Optics Express 27.2 (2019): 1433-1452.
West et al., "Impact of laser frequency noise on high-extinction optical modulation," Optics Express, vol. 28, No. 26, Dec. 21, 2020 (12 pages).
West et al., "Large mode size conversion via grating-assisted coupling between 1D and 2D optical waveguides," 2021 IEEE Photonics Conference (IPC), Vancouver, BC, Canada, 2021, pp. 1-2, doi: 10.1109/IPC48725.2021.9593087, 2 pages.
Yu et al., "Gigahertz acousto-optic modulation and frequency shifting on etchless lithium niobate integrated platform." arXiv e-prints (2020): arXiv-2006. 14 pages.

* cited by examiner

SEM of Lateral Grating Coupler

INTEGRATED DUAL-WAVEGUIDE ACOUSTO-OPTIC MODULATOR

CROSS-REFERENCE TO RELATED APPLICATION(S)

This application is a national-phase application, under 35 U.S.C. § 371, of International Application No. PCT/US2022/025025, filed Apr. 15, 2022, which in turn claims the priority benefit, under 35 U.S.C. § 119(e), of U.S. Application No. 63/211,928, which was filed on Jun. 17, 2021. Each of these applications is incorporated herein by reference in its entirety for all purposes.

GOVERNMENT SUPPORT

This invention was made with government support under FA8702-15-D-0001 awarded by the U.S. Air Force. The government has certain rights in the invention.

BACKGROUND

An acousto-optic modulator is a device that shifts the frequency and propagation direction of light using sound. A typical bulk acousto-optic modulator includes a transducer bonded to a large crystal, such as quartz or $TeO_2$. The transducer launches an acoustic wave into the crystal, creating a traveling or moving perturbation in the crystal's refractive index via the acousto-optic effect. Incident light diffracts off of this moving index perturbation, or grating, at an angle proportional the perturbation's period, which in turn is proportional to the period of the acoustic wave. Because the grating is moving, diffraction also shifts the frequency of the diffracted beam by an amount equal to the acoustic frequency. Tuning the acoustic frequency changes the period of the grating, changing the diffraction angle. It also changes the frequency shift.

Most integrated or on-chip acousto-optic modulators work according to similar principles. In a slab-coupled acoustic-optic modulator, for example, a transducer launches an acoustic wave along the surface of a one-dimensional (1D) or slab waveguide that is coupled to first and second two-dimensional (2D) waveguides. The slab waveguide is a structure that provides optical confinement in one dimension, allowing propagation along two other dimensions. The 2D waveguides are structures that provide optical confinement in two dimensions, allowing propagation along the third dimension. This acoustic wave diffracts light from a mode of the slab waveguide that couples to the first 2D waveguide into a mode that couples to the second 2D waveguide. Other integrated acousto-optic modulators use acoustic waves to couple light between crossed 2D waveguides or to modulate the evanescent coupling between parallel 2D waveguides.

Unfortunately, existing on-chip acousto-optic modulators struggle to achieve the performance of their bulk counterparts, particularly in terms of efficiency and extinction (ON/OFF) ratios. The extinction ratios of most integrated acousto-optic modulators are orders of magnitude lower than those of bulk acousto-optic modulators (e.g., <30 dB versus>50 dB) because the on-chip devices either (1) keep the incident and scattered light in the same waveguide, requiring high-fidelity separation of the two modes; or (2) inject the input light into an unconfined propagation region prone to parasitic diffraction and scattering.

SUMMARY

We have developed an integrated optical modulator that can operate with an extinction ratio of 50 dB or higher. This is on par with the extinction ratios of bulk acousto-optic modulators. It is also high enough for our integrated optical modulator to operate as a switch in quantum communications, atom-based clocks and quantum computing, and quantum memories. Our integrated optical modulator also has appealing efficiency, bandwidth, and footprint metrics.

Our integrated optical modulator can be implemented as an acousto-optic modulator comprising a slab waveguide, first and second 2D waveguides formed on the slab waveguide, and an acoustic transducer in acoustic communication with the first 2D waveguide. In operation, the acoustic transducer launches a surface acoustic wave along a surface of the slab waveguide toward the first 2D waveguide. This surface acoustic wave generates an index perturbation (grating) that couples an optical mode guided by the first 2D waveguide into the slab waveguide, causing the slab waveguide to couple the optical mode into the second 2D waveguide.

The acousto-optic modulator can operate at an extinction ratio of at least 50 dB. The first and second 2D waveguides can be at least 10 microns apart from each other and/or separated sufficiently to prevent evanescent coupling.

The first and second 2D waveguides can form a directional coupler, in which case the surface acoustic wave switches a propagation direction of the beam of light in the second 2D waveguide. The first and second 2D waveguides can be configured to guide the optical mode in roughly parallel directions or in roughly anti-parallel directions.

The second 2D waveguide may include at least one section forming an angle with respect to the first 2D waveguide. There may be a lateral grating, formed on the second 2D waveguide, to couple the beam of light from the slab waveguide into the second 2D waveguide.

The acousto-optic modulator may also include a third 2D waveguide grating formed on or next to the slab waveguide, in which case the refractive index perturbation in the first 2D waveguide can couple a backward-traveling beam of light guided by the first 2D waveguide into the third 2D waveguide via the slab waveguide.

An alternative modulator includes a slab waveguide; first and second ridge waveguides formed on the slab waveguide; a reflector formed in the slab waveguide on a first side of the first ridge waveguide; a partial reflector formed in the slab waveguide on a second side of the first ridge waveguide; and a light source in optical communication with the partial reflector. In operation, the light sources couples light into a cavity formed by the reflector and the partial reflector via the partial reflector. The light forms an optical interference pattern in the cavity that generates a refractive index perturbation across at least a portion of the first ridge waveguide. And the refractive index perturbation couples a beam of light guided by the first ridge waveguide into the slab waveguide, which in turn guides the beam of light into the second ridge waveguide.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. IF illustrates an integrated, dual-waveguide AOM configured to operate at a relatively low acoustic frequency (e.g., about 50-100 MHZ).

Figure 1C:
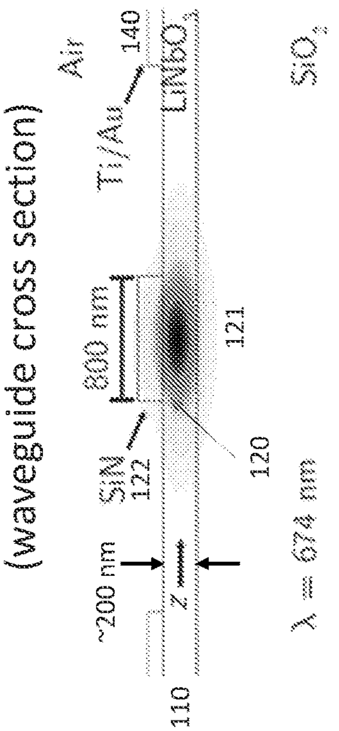
FIG. 1C is a profile view of a ridge waveguide on the slab waveguide in the integrated, dual-waveguide AOM of FIGS. 1A and 1B.
Figure 1A:
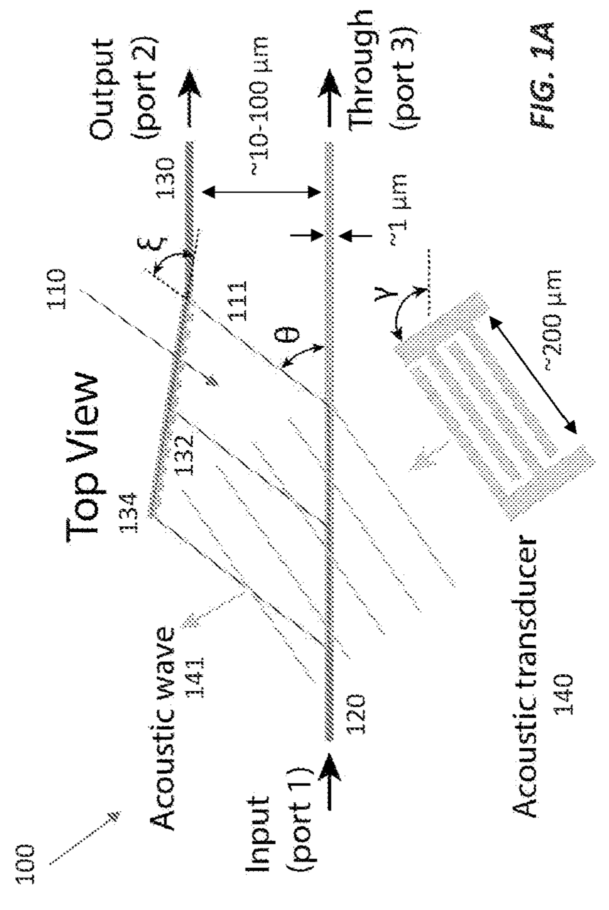
FIG. 1A is a plan view of an integrated, dual-waveguide acousto-optic modulator (AOM).
Figure 1B:
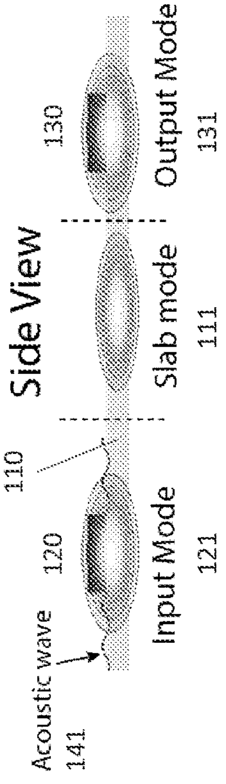
FIG. 1B is a profile view of the integrated, dual-waveguide AOM of FIG. 1A.
Figure 1E:
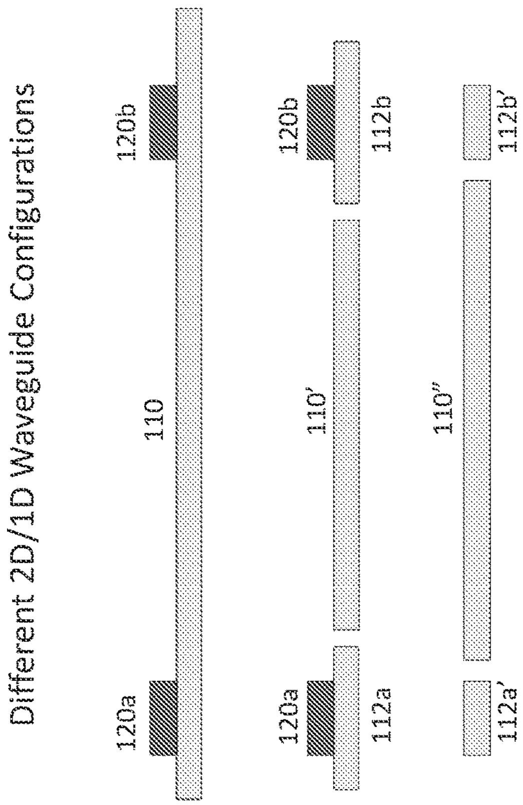
FIG. 1E illustrates different configurations of two-dimensional (2D) and slab waveguides for integrated AOMs.
Figure 1D:
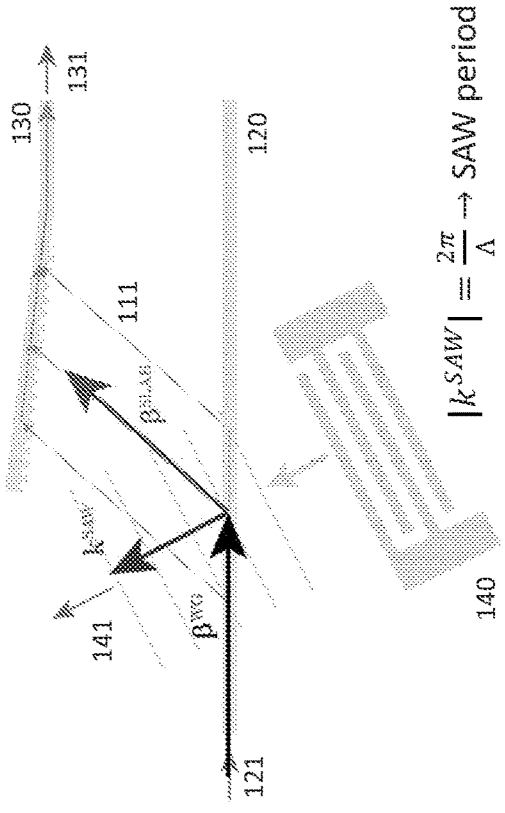
FIG. 1D illustrates diffraction of an optical wave (mode) by an acoustic wave in the integrated, dual-waveguide AOM of FIG. 1A.
Figures 1F, 1G:
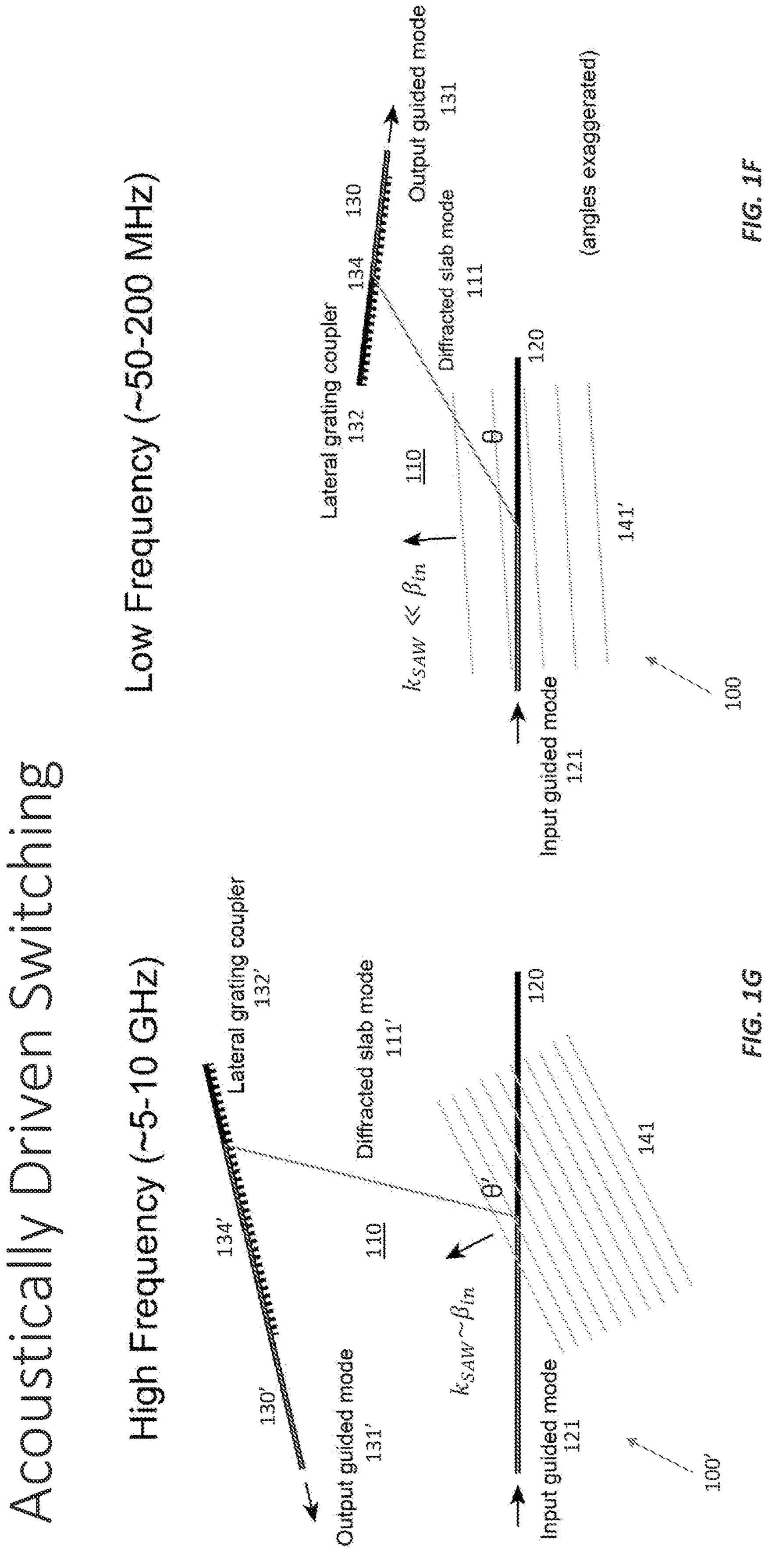

FIG. 1G illustrates an integrated, dual-waveguide AOM configured to operate at a relatively high acoustic frequency (e.g., about 5-10 GHz).

Figure 1H:
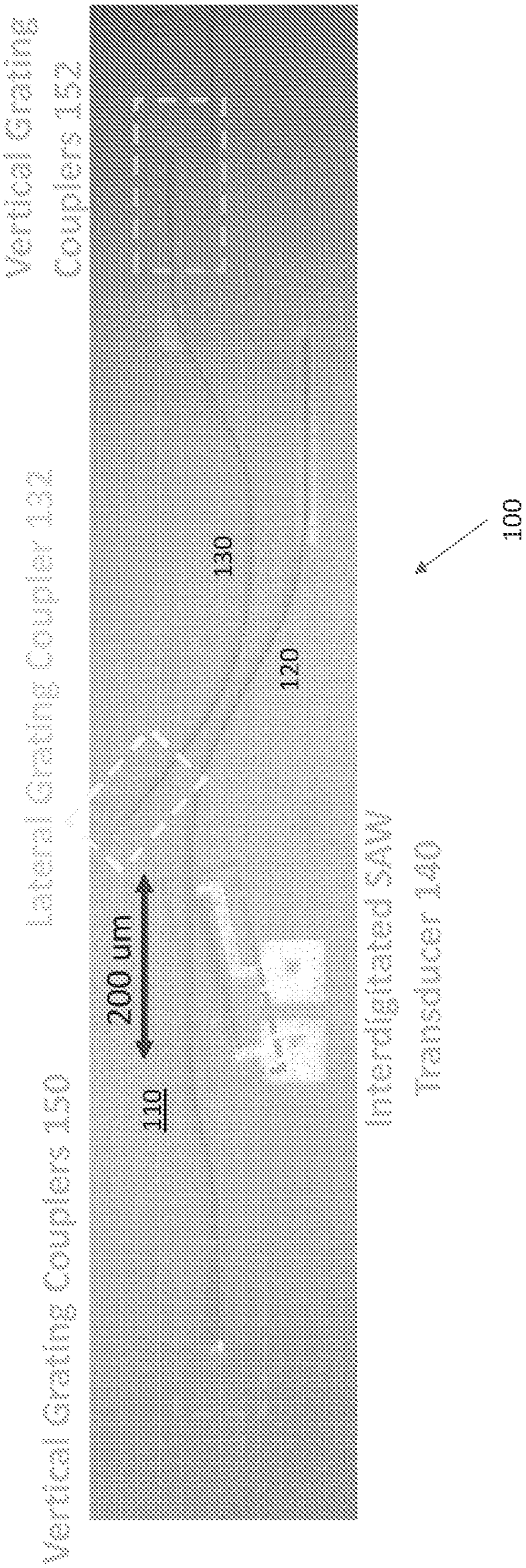

FIG. 1H is a photograph of an integrated, dual-waveguide AOM complete with an interdigitated surface acoustic wave (SAW) transducer for generating the acoustic wave and vertical grating couplers for coupling light into and out of the ridge waveguides.

Figure 2:
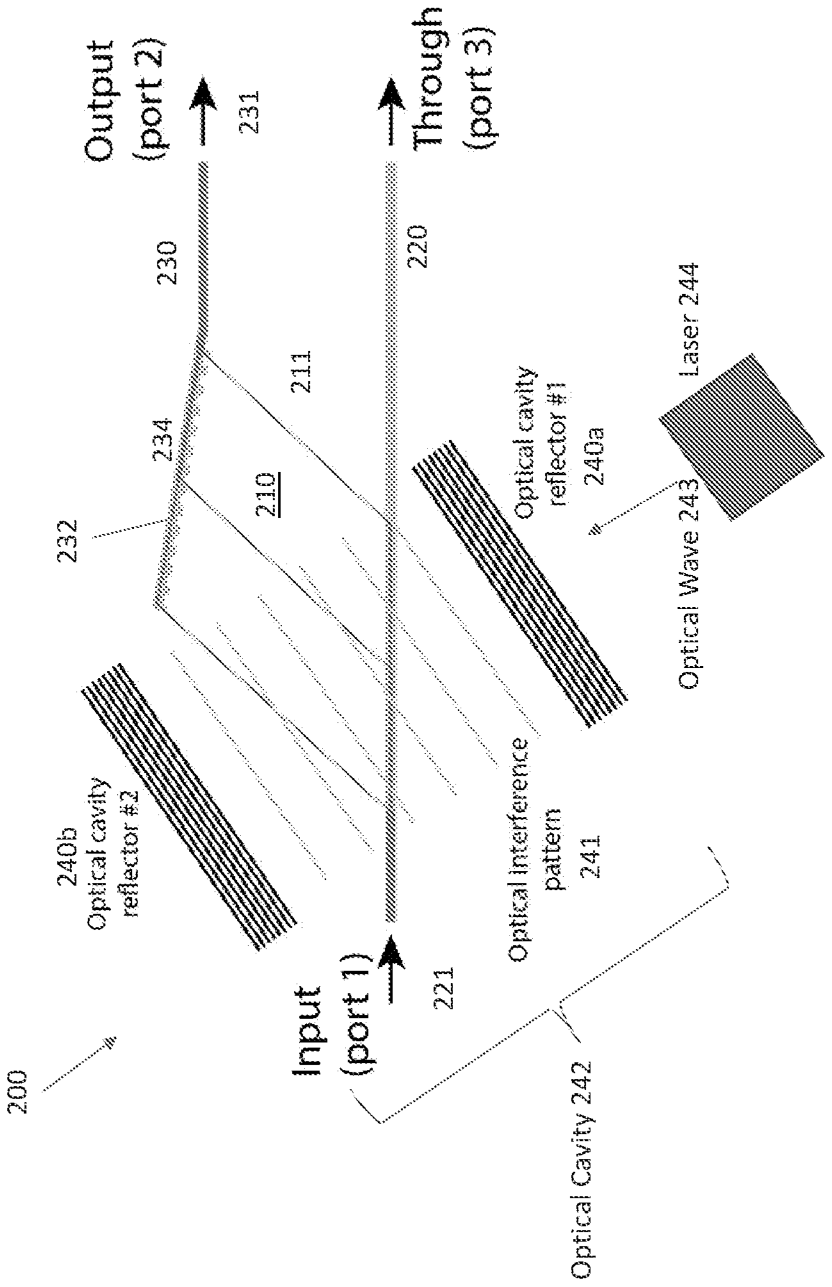

FIG. 2 illustrates how an optical interference pattern creates a standing or slowly moving index grating through material nonlinearity. An optional optical cavity in the slab mode increases the optical intensity and thus the strength of the generated grating.

Figure 3B:
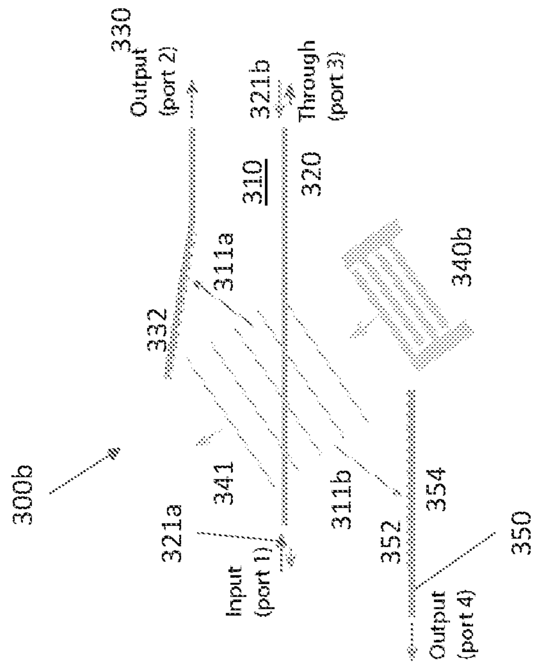
Figure 3A:
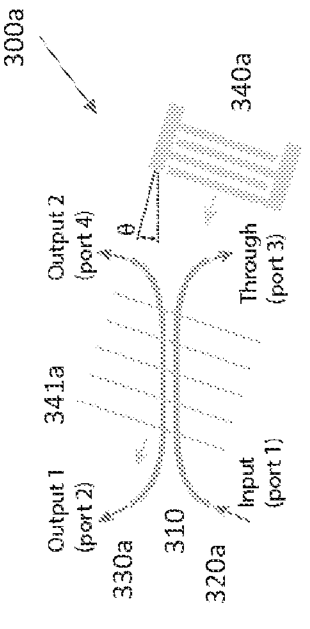

FIG. 3A illustrates an acoustically mediated directional or contra-directional coupler.

FIG. 3B illustrates a four-port AOM with two lateral grating couplers and one acoustic grating.

Figure 3D:
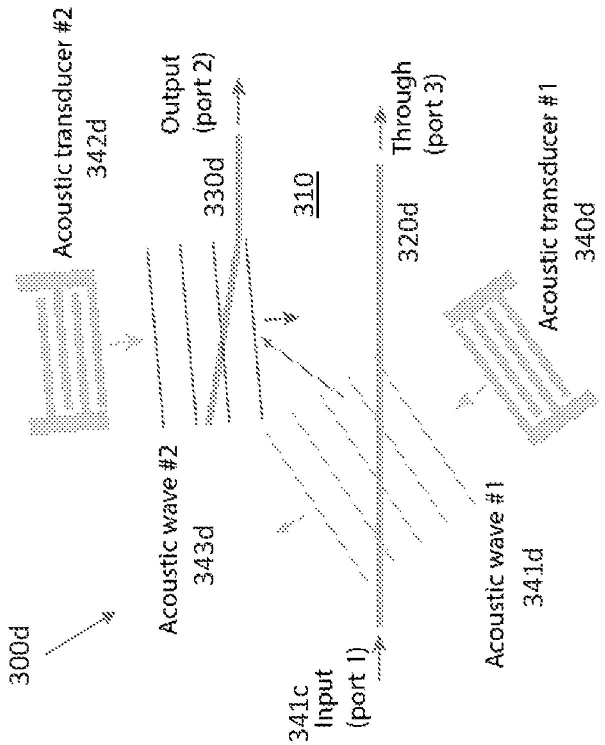
Figure 3C:
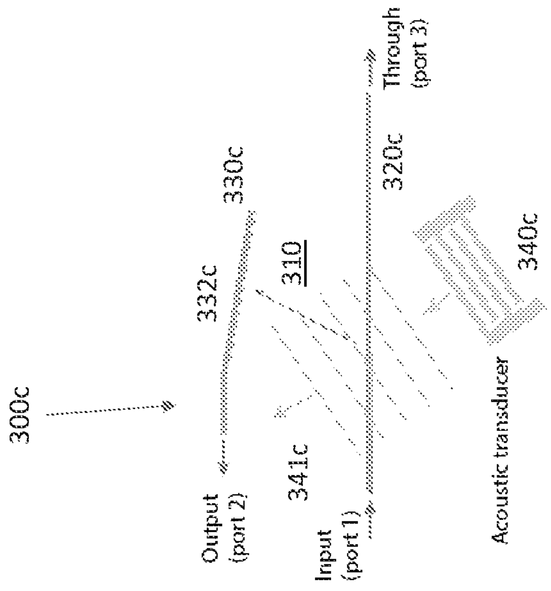

FIG. 3C illustrates a three-port AOM with backward-coupled output light.

FIG. 3D illustrates an AOM with a dynamic grating generated by a second acoustic transducer instead of a static lateral grating coupler.

Figure 4B:
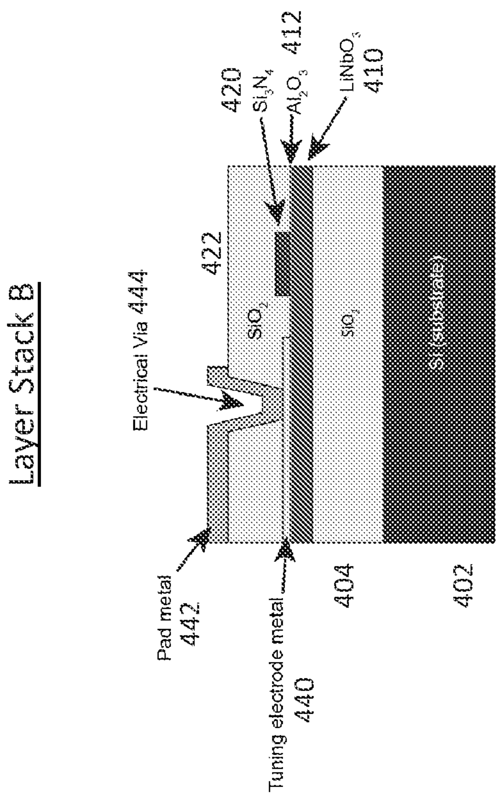
Figure 4A:
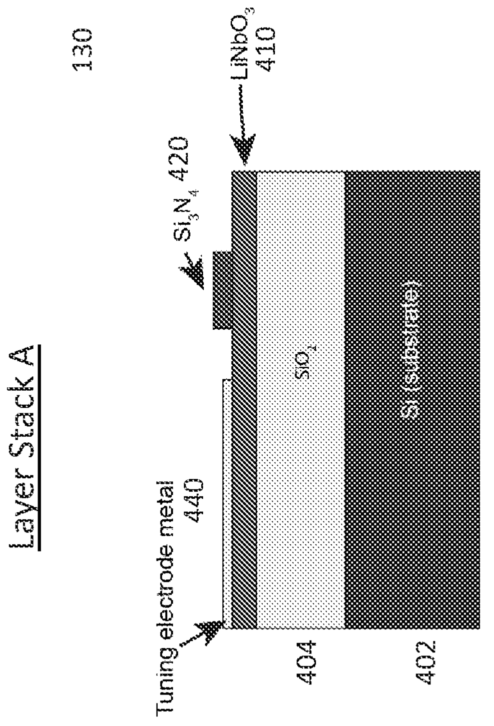

FIG. 4A illustrates a layer stack for an integrated, dual-waveguide AOM.

FIG. 4B illustrates an alternative layer stack for an integrated, dual-waveguide AOM.

Figure 5A:
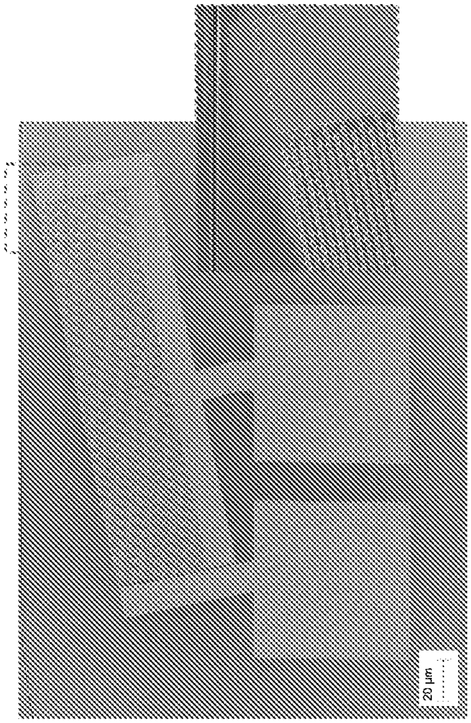

FIG. 5A is a scanning electron micrograph (SEM) of an interdigitated SAW transducer like the one shown in FIG. 4A.

Figure 5B:
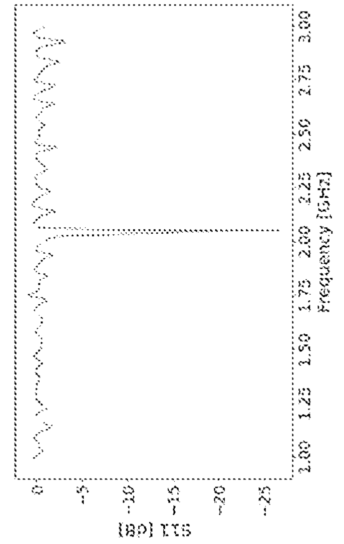

FIG. 5B is a plot of reflected power versus frequency for an interdigitated SAW transducer.

Figure 6B:
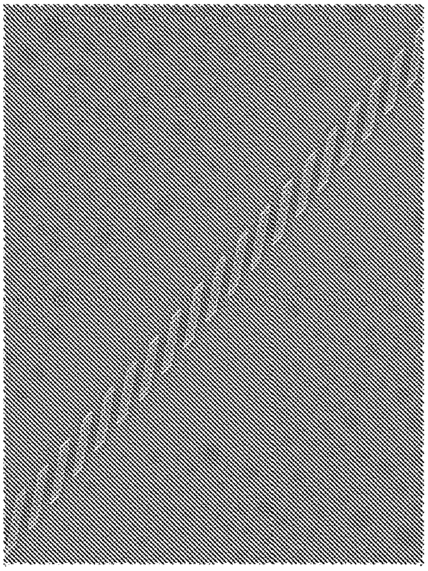
Figure 6A:
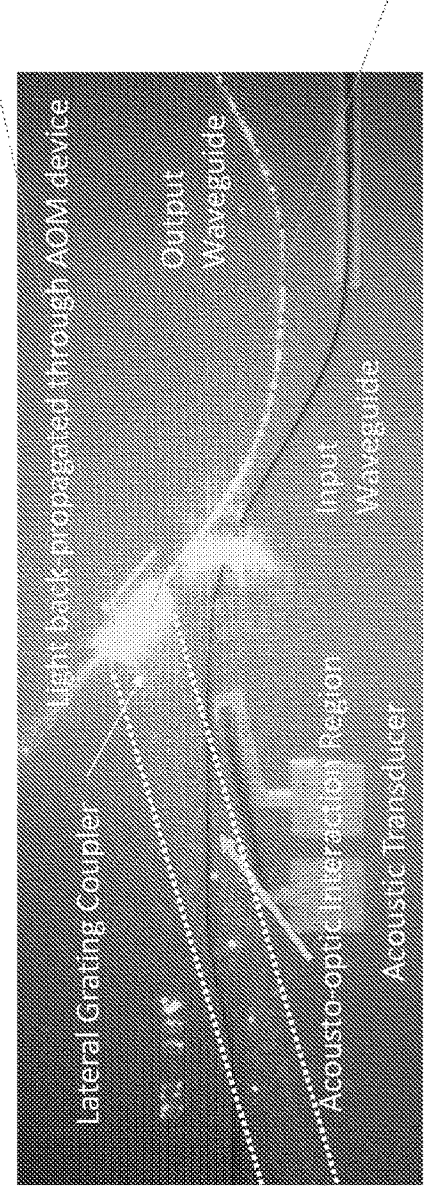

FIG. 6A is a photograph of an acoustic wave diffracting light from one ridge waveguide into another ridge waveguide via a slab waveguide in the integrated, dual-waveguide AOM of FIG. 4A.

FIG. 6B is an SEM of the grating coupler on the second ridge waveguide in the integrated, dual-waveguide AOM of FIG. 4A.

Figure 6C:
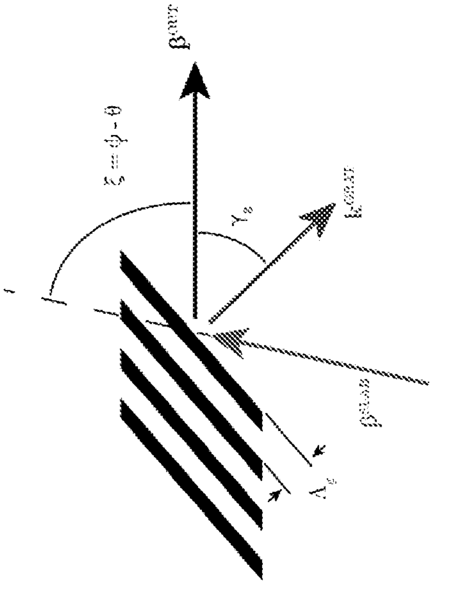

FIG. 6C is a schematic diagram of the grating coupler shown in FIG. 6B.

Figure 6D:
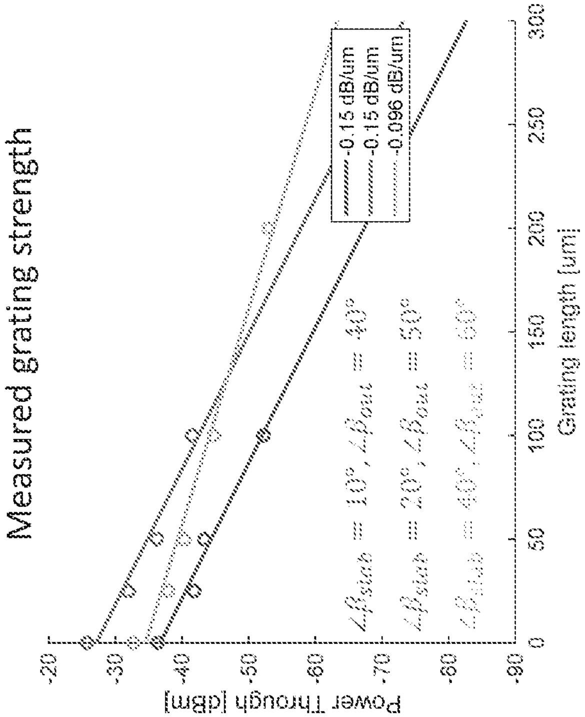

FIG. 6D is a plot of measured grating strength for different lateral grating couplers.

DETAILED DESCRIPTION

Our optical modulator can be thought of as comprising two grating elements which scatter light from input to output. For the modulator to operate as a switch, at least one of these grating elements should be dynamic, while the other grating element can be dynamic or static. The dynamic grating element(s) can be implemented by introducing an acoustic or optical wave that forms a refractive index grating through a nonlinear effect, such as the photo-elastic (aka strain-optic) effect or electro-optic effect. This refractive index grating acts as a lateral grating coupler whose diffractive shape is formed by the acoustic or optical wave and is thus tunable (amplitude/on/off, frequency, phase). The static grating element can be implemented by patterning a diffractive shape into the device. In analogy to vertical grating couplers used to couple light from single-mode waveguides into free space for optical input and output, a diffractive static grating element is called a lateral grating coupler.

Examples of our optical modulator can operate with an extremely high extinction ratio (e.g., >50 dB), making it particular useful for quantum and atomic systems. For example, it can be used for switching control pulses for optically addressed atoms, ions, or color centers or for pump conditioning for single-photon sources. It can also be used as an intra-cavity filter or an external element to do feedback or feed-forward correction of the output laser frequency for continuous-wave lasers or as a pulse-shaping element for pulsed and ultrafast lasers.

Integrated Acousto-Optic Modulators

FIGS. 1A-1H illustrate an example of our integrated acousto-optic modulator 100, where one grating is an acoustically generated grating and the other grating is a static lateral grating coupler. (Alternatively, both gratings could be formed by acoustic waves.) It can operate with an extinction ratio of 50 dB, 55 dB, 60 dB, 65 dB, 70 dB, or higher using two spatially separated waveguides, each of which confines light in two dimensions. In this context, the extinction ratio is the ratio of optical intensity at the output port when the acousto-optic modulator 100 is not actuated (off) to the optical intensity at the output port when the acousto-optic modulator is fully actuated (on).

FIG. 1A shows a plan view of the integrated acousto-optic modulator 100, which includes first and second 2D waveguides formed as ridge waveguides 120 and 130 on a slab waveguide 110. FIGS. 1B and 1C show the slab waveguide 110 and ridge waveguides 120 and 130 in profile. Each ridge waveguide 120, 130 confines light in two dimensions and the slab waveguide 10 confines light in one dimension. FIG. 1C shows that each ridge waveguide 120, 130 can be formed of a silicon nitride strip 122 that is about 800 nm wide on top of the slab waveguide 110, which can be made of the same material as the waveguide or can be made of a layer of another material, such as lithium niobate, which is disposed on a silicon dioxide layer on a silicon substrate. The ridge waveguides 120, 130 have ridge widths selected to support only a single transverse mode in the confined direction, and the slab waveguide 110 has a thickness chosen to support only a single transverse mode in the confined direction (e.g., 200 nm thick for lithium niobate at a wavelength of 780 nm). The first and second ridge waveguides 120, 130 are separated by 10-100 μm to prevent evanescent coupling between them. In addition, the second ridge waveguide 130 has a section 134 that forms an angle of $\zeta$ with respect the first ridge waveguide 120 as shown in FIG. 1A. This angle is called the lateral grating diffraction angle and can range from −180° to 180° (practically, from −175° to −5° or from 5° to) 175°.

The relatively large separation (e.g., 10-100 μm) between the first and second waveguides 120, 130 reduces parasitic coupling (e.g., evanescent coupling) between the first and second waveguides 120, 130. However, this large separation normally would introduce a large optical loss due to diffraction when the light propagates from input to output. Deflecting light from the 2D input waveguide mode 121 into the slab waveguide mode 111 allows the light to propagate significant distances in the slab waveguide 110 with negligible loss. The lateral grating coupler 132 returns the light to a 2D output waveguide mode 131 guided by the second waveguide 130.

This angled section 134 may include a lateral grating coupler 132 that couples light from the slab waveguide 110 into the second (output) ridge waveguide 130, much like a vertical grating coupler couples light into or out of a planar waveguide structure. The length of the angled section 134 is set by the acoustic diffraction angle θ (described below), the lateral grating diffraction angle ζ, and the acousto-optic interaction length L to be L sin θ/sin ζ, where the acousto-optic interaction length can range from about 50 μm to about 1 cm. As the acoustic diffraction angle decreases, so does the lateral grating length, which in turn increases the optical bandwidth of the lateral grating coupler 132.

The lateral grating coupler 132 can be formed permanently by patterning a diffractive structure into the output waveguide 130 as shown in FIG. 1A or in a switchable fashion with an acoustic wave, generated by a separate acoustic transducer (e.g., as in FIG. 3D, described below), or by introducing a strong optical wave, creating a standing wave interference pattern, that induces an index grating through material nonlinearities such as the Pockels or Kerr effect (e.g., as in FIG. 2, also described below). The lateral grating coupler 132 has a grating period that is on the order of the free-space wavelength over twice the ridge waveguide effective mode refractive index and can have a length that ranges from about 5 μm to about 1 cm. The lateral grating coupler 132 can be blazed to promote unidirectional emission/collection. Alternatively, the lateral grating coupler 132 can be configured to couple light into two directions, possibly at the expense of reduced emission/collection efficiency. There is no physical upper limit to the coupling efficiency of the lateral grating coupler 132 (100% input/output coupling efficiency is possible), with fabrication imperfections potentially reducing efficiency to about 80% (about 1 dB loss).

In addition to coupling light into the second (output) ridge waveguide 130, the lateral grating coupler 132 can also act as a mode expander/condenser and/or a spectral filter. The mode guided by the input ridge waveguide 120 may be on the order of 1 micron in width and expands to a width of tens to hundreds of microns when coupled into the slab waveguide 110. The lateral grating coupler's strength can be uniform, or varied (e.g., apodized to match the diffracted slab waveguide mode) along its length to generate shaped phase and amplitude profiles (e.g., Gaussian, flat-top, etc.). The grating strength α as a function of position z to achieve a desired output mode profile H(z) can be calculated using $$\alpha(z) = H(z)/\left[1 - \int_0^z H(t)^2 dt\right].$$

Similarly, by choice of design parameters (e.g., grating length and diffraction strength), an optically narrowband lateral grating can be realized which spatially separates colors in the slab mode (e.g., to create a spectrometer or color-sensitive device), in analogy to a surface grating in free-space.

The acousto-optic modulator 100 also includes an acoustic transducer 140 that is formed on the slab waveguide 110 on the opposite side of the first ridge waveguide 120 from the second ridge waveguide 130. The acoustic transducer 140 is shown in FIG. 1A as an interdigitated, piezoelectric transducer with electrodes made of aluminum, titanium, gold, or another suitable material. Other types of transducers can be used instead of piezoelectric transducers, including thermal transducers, such as those based on temperature-induced material expansion, and optical transducers, such as those based on phonon-generating nonlinear processes or optical electric-field-induced responses.

FIGS. 1A and 1D illustrate the geometry of the acousto-optic interaction. When the acousto-optic modulator 140 is not actuated (off), the first (input) waveguide 120 guides light from an input port (port 1) to a through port (port 2) in a first waveguide mode 121. Driving the acoustic transducer 140 with a radio-frequency or microwave signal (e.g., at 50 MHz to 10 GHz) causes the acoustic transducer 140 to launch a surface acoustic wave 141 toward the first waveguide 120 at an angle. This angle, γ, is called the surface acoustic wave (SAW)-waveguide angle and is set by phase-matching conditions, dictated by the waveguide and slab modal effective indices, for a given acoustic diffraction angle θ.

This surface acoustic wave 141 has a wavelength Λ and a wave vector whose magnitude $|k^{SAW}|=2\pi/\Lambda$ and is shown in profile on the left side of FIG. 1B. The surface acoustic wave 141 creates an index perturbation, or grating, in the layer that defines the slab and ridge waveguides. This grating diffracts the optical mode 121 guided by the first waveguide 120 into a slab waveguide mode 111 guided by the slab waveguide 110 as shown in FIG. 1D. This optical mode 111 propagates in the slab waveguide 110 at the acoustic diffraction angle θ until it reaches the lateral grating coupler 132, which couples the light into an optical mode 131 guided by the second waveguide 130. The second waveguide 130 which guides the light (optical mode 131) to an output port (port 3). Thus, the acousto-optic modulator 100 acts as an "acoustically mediated coupler" where the ability to control amplitude, phase, and/or frequency the acoustic wave 141 allows it to be used as a modulator or switch. The acoustic diffraction efficiency can be modulated or adjusted by adjusting the intensity of the acoustic wave 141, which in turn adjusts the strength of the acousto-optic grating.

FIG. 1E shows profile views of different configurations of 1D and 2D waveguides for integrated acousto-optic modulators. The top configuration is the same as the one shown in FIGS. 1B and 1C, with ridges or strips 120*a*, 120*b* on the slab waveguide 110. In the middle configuration, the ridges 120*a* and 120*b* are on sections 112*a* and 112*b* of the slab layer, respectively, that are each spaced from the slab material that forms the slab waveguide 110' by up to a couple of microns (e.g., up to 0.1, 0.5, 1, 2, 3, 4, or 5 μm). Together, the ridges 120*a* and 120*b* and sections of slab material 112*a* and 112*b* form the input and output 2D waveguides. In the bottom configuration, there are no ridges; the 2D waveguides are formed of sections of slab material 112*a*' and 112*b*' that form part of the same layer as but are separated from the slab waveguide 110".

The slab and strips can be made of silicon nitride, lithium niobate, or another suitable material. Lithium niobate is especially useful as the slab waveguide 110 because it is piezoelectric and thus allows direct electrical generation of acoustic waves. If the slab and ridge waveguides. If the slab and ridges are made of silicon nitride, then the acousto-optic modulator may include a small patch of piezoelectric material immediately under the transducer to achieve the same. The refractive index of the slab waveguide 110 can be lower, higher, or the same as the refractive index of the ridges 120*a*, 120*b*.

FIGS. IF and 1G illustrate how the acoustic diffraction angle 0 depends on the frequency of the acoustic wave 141 and how this influences the exact geometry and arrangement of the ridge waveguides 120 and 130, lateral grating coupler 132, and acoustic transducer 140. Changing the acoustic frequency changes the magnitude of the acoustic grating vector, sweeping the acoustic diffraction angle θ. At low acoustic frequencies (e.g., 50-200 MHz), the acoustic grating vector has a much smaller magnitude than the optical wave vector and thus the acoustic wave 141 deflects the optical mode 121 by a smaller acoustic diffraction angle θ as shown in FIG. IF. Increasing the acoustic frequency (e.g., to 5-10 GHz) increases the magnitude of acoustic grating vector and the acoustic diffraction angle θ' as shown in FIG. 1G. FIGS. 1F and 1G also show that the orientation of the acoustic transducer 140 (and hence of the acoustic wave 141) may be different for acousto-optic modulators operating at different acoustic frequencies to ensure phase matching between the acoustic and optical waves.

FIGS. 1F and 1G also show that the second waveguide 130, 130' can guide the output optical mode 131, 131' in different directions. In FIG. 1F, the second waveguide 130 has an angled section 134 that slopes downward from left to right. The lateral grating coupler 132 couples the slab waveguide mode 111 into the second waveguide 130, which guides the resulting output optical mode 131 in a direction roughly parallel to the input waveguide 120 and the propagation direction of the input mode 121. In FIG. 1G, the second waveguide 130' has an angled section 134' that slopes downward from right to left rather than left to right. The lateral grating coupler 132' formed in the angled section 134' couples the slab waveguide mode 111 into the second waveguide 130', which guides the resulting output optical mode 131' in a direction roughly anti-parallel to the input waveguide 120 and the propagation direction of the input mode 121.

FIG. 1H is a plan view of a fabricated version of the integrated acousto-optic modulator 100 showing the input waveguide 120, output waveguide 130, lateral grating coupler 132, and interdigitated SAW transducer 140 on the slab waveguide 110. The acousto-optic modulator 100 also includes an input vertical grating coupler 150 at the input to the input waveguide 120 and an output vertical grating coupler 152 at the output of the output waveguide 130.

Integrated Optical Modulators/Switches

FIG. 2 shows a plan view of an optical modulator or switch 200 that uses an optically mediated dynamic grating instead of acoustically mediated dynamic grating to couple light between a pair of 2D waveguides 220 and 230. Like the acousto-optic modulator 100 in FIGS. 1A-1F, the optical modulator 200 in FIG. 2 includes input and output ridge waveguides 220 and 230 on a slab waveguide 210. The input and output ridge waveguides 220 and 230 are at least 10 μm apart to prevent evanescent coupling, and the output ridge waveguide 230 has an angled section 234 that is patterned with a (static) lateral grating coupler 232.

Instead of an acoustic transducer, the optical modulator 200 in FIG. 2 has a pair of optical cavity reflectors 240*a* and 240*b* (collectively, cavity reflectors 240), which can be implemented as Bragg stacks in or on the slab waveguide 210 (e.g., as a Bragg reflector for the slab waveguide mode). The optical cavity reflectors 240 define an optical cavity 242 whose longitudinal axis forms an angle with the longitudinal axis of the input ridge waveguide 220. A single-longitudinal-mode laser 244 or another suitable optical source couples an optical wave 243 into the optical cavity, e.g., through one of the optical cavity reflectors 240, either of which can be configured as an input coupler or partial reflector. The wavelength of this optical wave 243 should be approximately the same as the acoustic wavelength in the slab waveguide 210, for example, from about 300 nm to about 2,000 nm. This wavelength may be very close to the wavelength of light that is guided by the input waveguide 220 and modulated by the modulator 200. For a 780 nm optical wavelength in a $LiNbO_3$ slab waveguide 210, the corresponding acoustic frequency is 1-4 GHz.

The optical wave 243 resonates in the optical cavity 242, resulting in a standing wave or optical interference pattern 241 that produces a dynamic refractive index grating in the input ridge waveguide 220 and the slab waveguide 210 via a nonlinear optical effect, such as the electro-optic effect or the Kerr effect. Tuning the period, phase, amplitude, and shape of the optical wave 234 (and hence of the optical interference pattern 241) tunes the period, phase, amplitude, and shape of the dynamic refractive index grating.

This grating couples light from the input ridge waveguide 220 to the output ridge waveguide 230 via the slab waveguide 210 and the lateral grating coupler 232. More specifically, the input ridge waveguide 220 guides an input mode 221 that diffracts off the (dynamic) refractive index grating into a mode 211 guided by the slab waveguide 210. The slab waveguide 210 guides the slab waveguide mode 211 to the lateral grating coupler 232, which couples the slab waveguide mode 211 into an output mode 231 guided by the output ridge waveguide 230.

The optical interference pattern can be a true standing wave or a standing wave with time-varying frequency, depending on whether or not it is modulated in time. If the optical interference pattern 241 is a true standing wave, it does not shift the frequency of the diffracted light. And if the optical interference pattern 241 is a time-varying standing wave, then the lifetime of photons generating the standing wave is so short that a change in optical frequency more or less instantaneously changes the standing wave period.

The orientations of the dynamic grating/standing wave 241, optical cavity 242, and angled section 234 and the wavelength of the optical wave 243 can be selected based on the desired modulator size and geometry and the desired propagation direction of the output mode 231. More generally, the modulator geometry depends on the operating wavelength, the materials used (which affect the diffraction efficiency of the lateral grating), and the desired acoustic frequency. In the modulator 200 shown in FIG. 2, the output mode 231 and input mode 221 propagate in roughly parallel directions. An alternative modulator could emit an output mode in roughly the opposite direction as the input mode, e.g., as in FIG. 1F.

Modulator Architectures

FIGS. 3A-3D show alternative modulator architectures using dynamic (e.g., acoustic) and static gratings like those described above. FIG. 3A shows an acoustically mediated directional/contra-directional coupler 300*a* with parallel input and output 2D waveguides 320*a*, 330*a* on a slab waveguide 310. In this case, the input and output 2D or ridge waveguides 320*a*, 330*a* are close enough to each other for a mode guided by the input ridge waveguide 320*a* to be evanescently coupled into the output ridge waveguide 320*b* or vice versa. The separation distance and lengths of the parallel sections of the ridge waveguides 320*a*, 320*b* are selected based on the desired coupling ratio (e.g., 50/50, 90/10, 99/1, etc.) of the coupler 300*a*. The interaction length (lengths of parallel sections) of the ridge waveguides 320*a*, 320*b* may be in the range of 10-200 μm.

The coupling between input and output 2D waveguides 320*a*, 330*a* is modified by the presence of an acoustic wave 341*a* from an acoustic transducer 340*a*. More specifically, with the acoustic transducer 340*a* off (i.e., no acoustic wave 341*a* present), at least a portion of a forward-propagating mode guided by the input waveguide 320*a* evanescently couples into a forward-propagating guided by the output waveguide 330*a*. When the acoustic transducer 340*a* is on, it emits an acoustic wave 341*a* that produces a dynamic grating that diffracts at least a portion of forward-propagating mode guided by the input waveguide 320*a* into a backward-propagating mode guided by the output waveguide 330*a* via the slab waveguide 310. This acoustic wave 341*a* overlaps significantly with the directional coupler's interaction length. Modulating the amplitude of the acoustic wave 341*a* modulates the ratio of forward/backward propagating light. And turning the acoustic transducer 340*a* off turns the backward coupling off altogether. Thus, the coupler's output can propagate in the same direction as the input (directional coupler), be reflected and travel in the opposite direction of the output (contra-directional coupler), or both, depending on the acoustic wave 341*a*.

FIG. 3B shows an acoustic modulator 300*b* like those in FIGS. 1A-1H, but with a third ridge waveguide 350 that is on the other side of the first (input) ridge waveguide 320 from the second (output) ridge waveguide 330. This third ridge waveguide 350 is widely separated (e.g., by at least 10 μm) from the first ridge waveguide 320 to prevent parasitic coupling from the first ridge waveguide 320 and includes a section 354 that is patterned with a lateral grating coupler 352. In this case, the first ridge waveguide 320 guides a first optical beam 321*a* from port 1 to port 2 (left to right) and a second optical beam 321*b* from port 2 to port 1 (right to left) simultaneously. These beams 321 may be at different wavelengths and/or may be on at different times (i.e., the beams may be wavelength-and/or time-division multiplexed, counter-propagating beams).

The acoustic transducer 340 is positioned to emit an acoustic wave 341 that generates a dynamic grating as described above. The dynamic grating diffracts the first beam 321*a* into a first slab waveguide mode 311*a* propagating toward the second ridge waveguide 330 and diffracts the second beam 321*b* into a second slab waveguide mode 311*b* propagating toward the third ridge waveguide 350 as shown in FIG. 3B. The lateral grating couplers 332, 352 on the second and third ridge waveguides 330, 350 couple the slab waveguide modes 311*a*, 311*b* from the slab waveguide 310 into the second and third ridge waveguides 330, 350, respectively. The second ridge waveguide 330 guides light to port 2 and the third ridge waveguide 350 guides light in roughly the opposite direction to port 4.

FIG. 3C shows an acousto-optic modulator 300*c* like the one in FIG. 1G, illustrating how the output direction can be chosen arbitrarily by controlling the lateral grating coupler periodicity. This acousto-optic modulator 300*c* includes an input ridge waveguide 320*c* and an output waveguide 330*c* on a slab waveguide 310*c*. An acousto-optic transducer 340*c* formed on the slab waveguide 310*c* emits an acoustic wave 341*c* that generates a time-varying index perturbation that diffracts light out of the input ridge waveguide 320*c* and into the slab waveguide 310*c*. A lateral grating coupler 332*c* at one end of the output ridge waveguide 330*c* couples the slab waveguide mode into the output ridge waveguide 330*c*. In this configuration, the output ridge waveguide 330*c* is angled to guide light in approximately the opposite direction to the beam coupled into port 1 of the input ridge waveguide 320*c*. Put differently, this configuration has a counter-propagating output, illustrating that coupling into the second (output) waveguide 320*c* can be forward or backward, depending on the diffraction angles and lateral grating coupler 332*c* configuration.

FIG. 3D shows an integrated acousto-optic modulator 300*d* with two dynamic acousto-optic gratings and no lateral grating coupler. Like the modulators described above, it includes a slab waveguide 310*d*, input 2D waveguide 320*d*, output 2D waveguide 330*d*, and acoustic transducer 340*d*. The acoustic transducer 340*d* emits an acoustic wave 341*d* that diffracts light into the slab waveguide 310*d* from the input 2D waveguide 320*d* via an acousto-optic interaction. The slab waveguide 310*d* guides the diffracted light to the output 2D waveguide 330*d*.

Instead of diffracting off a (fixed) lateral grating coupler, the light in the slab waveguide 310*d* diffracts of a grating formed by a second acoustic wave 343*d* and into the output 2D waveguide 330*d*. The second acoustic wave 343*d* is emitted by a second acoustic transducer 342*d*, which is on the slab waveguide 310*d* on the other side of the output 2D waveguide 330*d*. The second acoustic wave 343*d* propagates from the second acoustic transducer 342*d* toward the first acoustic transducer 340*d*. The coupling efficiency/grating strength can be modulated by modulating the second acoustic wave 343*d*.

The first and second acousto-optic gratings propagate in roughly opposite directions and diffract different orders, i.e., +1 and −1 orders. As a result, diffraction off the first acousto-optic grating (associated with the first acoustic wave 341*d*) increases or upshifts the frequency of the optical wave, whereas diffraction off the second acousto-optic grating (associated with the second acoustic wave 343*d*) decreases or downshifts the frequency of the optical wave. As a result, the net frequency shift of the output beam with respect to the input beam may be lower than the frequency shifts imparted by acousto-optic modulators with static lateral grating couplers.

Other configurations are also possible. For instance, a single input 2D waveguide can be coupled to a series of output 2D waveguide via different acoustic transducers. These transducers and output 2D waveguides can be staggered along the length of the input 2D waveguide, with each transducer coupling light to a corresponding output 2D waveguide. If there are N acoustic transducers and output 2D waveguides, the device can operate as a 1×N switch, with light propagating out one output at a time. The acoustic transducers can also be modulated so that light propagates out of more than one output at a time, with the power at each output modulated as desired. The transducers can operate at the same frequency or at different frequencies so that the outputs are frequency-shifted by the same or different amounts.

An integrated acousto-optic modulator can also operate as a wavelength-division multiplexed (WDM) modulator where N>1 signals at different microwave/RF frequencies are multiplexed and applied to the acoustic transducer. Each signal generates an acoustic wave that is phase-matched to a single input optical wavelength. In this way, the integrated acousto-optic modulator can modulate signals in N optical WDM channels simultaneously and independently, The induced frequency shifts are different for each WDM channel are small relative to the frequency separation between the WDM channels. The ability to couple these modulated optical signals is restricted by the optical collection bandwidth of the grating that couples light from the slab waveguide into the output 2D waveguide.

Fabrication and Performance of an Integrated Acousto-Optic Modulator

FIGS. 4A and 4B show cross-sectional views of different layer stacks for an integrated acousto-optic modulator. The layer stack in FIG. 4A is made of a silicon substrate 402 that supports a silicon oxide layer 404, which in turn supports a layer of lithium niobate 410. This lithium niobate layer 410 acts as a slab waveguide that confines light in the vertical direction and supports modes propagating in the transverse directions. This layer stack also includes silicon nitride strips 420 (only one is shown in FIG. 4A) that act as ridge waveguides. The silicon nitride strips 420 have higher refractive indices than the lithium niobate layer 410; as a result, each silicon nitride strip 420 helps to confine optical modes to volumes within the lithium niobate layer 410 that are directly beneath that strip. Thus, the lithium niobate layer 410 confines the light vertically and the silicon nitride strip 420 confines light in one transverse dimension, providing two-dimensional confinement. Tuning electrode metal 440 on a different portion of the lithium niobate layer 410 can be patterned to provide an interdigitated SAW transducer for launching acoustic waves toward the input ridge waveguide.

The layer stack in FIG. 4B also includes a silicon substrate 402, silicon oxide layer 404, and lithium niobate layer 410 with silicon nitride strips 420 and tuning electrode metal 440 on the lithium niobate layer 410. Again, the lithium niobate layer 410 acts as a slab waveguide, the silicon nitride strips 420 define the input and output ridge waveguides, and the tuning electrode metal 440 is patterned to the acoustic transducer. This layer stack also includes a thin aluminum oxide layer 412 on top of the lithium niobate layer 410 and under the silicon nitride strips 420 and tuning electrode metal 440. This aluminum oxide layer 412 acts as etch stop for etching or patterning the silicon nitride strips 420 and tuning electrode metal 440, preventing damage to the lithium niobate layer 410 during the etching process. The silicon nitride strips 420 and tuning electrode metal 440 are covered in additional silicon oxide 422, with pad metal 442 extending through a hole or via in the additional silicon oxide 422 to the tuning electrode metal 440. The additional silicon oxide 422 reduces the temperature sensitivity coefficient of the acoustic frequency (the acoustic transducer's center frequency is temperature dependent through material property temperature dependence); reduces the index contrast at surfaces near the optical mode, reducing optical scattering loss; and protects the optical structures (e.g., from dirt, debris in the atmosphere from depositing on top). The pad metal 442 serves as an electrical contact for connecting the acoustic transducer to a microwave signal generator or other source for driving the acoustic transducer at microwave or millimeter-wave frequencies.

FIGS. 5A and 5B illustrate the fabricated acoustic transducer. FIG. 5A is a scanning electron micrograph (SEM) of the acoustic transducer, with the inset showing a closeup of the interdigitated or interlocking, comb-shaped arrays. Each comb-shaped array is coupled to its own pad or electrical contact. FIG. 5B is a plot of the reflected power (S11 parameter) from the acoustic transducer as a function of frequency. In this case, the acoustic transducer reflect power with a ripple of less than about 3 dB over a band from 1 GHz to 3 GHz except at the design frequency of 2 GHz.

FIGS. 6A-6D illustrate design and fabrication of the lateral grating coupler in an example acoustic modulator. FIG. 6A is a photograph of the example acoustic modulator guiding light in the backwards direction, through the output waveguide to the lateral grating coupler, which diffracts the light into the acousto-optic interaction region. FIG. 6B is an SEM of the lateral grating coupler, showing its periodic, blazed structure. FIG. 6C is a schematic of the lateral grating coupler showing the addition of the incident slab waveguide mode wave vector $\beta^{SLAB}$ and grating vector $k^{GRAT}$ to produce the output mode guided by the output ridge waveguide $\beta^{OUT}$ And FIG. 6D is a measurement of the grating strength, with power transmitted through the grating (i.e., undiffracted light) versus grating length for different propagation angles for the slab waveguide and output modes.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An acousto-optic modulator comprising:

a slab waveguide;

a first two-dimensional (2D) waveguide formed on or adjacent to the slab waveguide;

a second 2D waveguide formed on or adjacent to the slab waveguide to guide light; and an acoustic transducer, in acoustic communication with the first 2D waveguide, to launch a surface acoustic wave along a surface of the slab waveguide toward the first 2D waveguide, the surface acoustic wave generating a refractive index perturbation that couples a beam of light guided by the first 2D waveguide into the slab waveguide, the slab waveguide guiding the beam of light to the second 2D waveguide.

2. The acousto-optic modulator of claim 1, wherein the acousto-optic modulator is configured to operate at an extinction ratio of at least 50 dB.

3. The acousto-optic modulator of claim 1, wherein the first 2D waveguide is at least 10 microns from the second 2D waveguide.

4. The acousto-optic modulator of claim 1, wherein the first 2D waveguide and the second 2D waveguide are separated sufficiently to prevent evanescent coupling.

5. The acousto-optic modulator of claim 1, wherein the first 2D waveguide and the second 2D waveguide form a directional coupler and the surface acoustic wave switches a propagation direction of the beam of light in the second 2D waveguide.

6. The acousto-optic modulator of claim 1, wherein the first 2D waveguide is configured to guide the beam of light in a first direction and the second 2D waveguide is configured to guide the beam of light in a second direction roughly parallel to the first direction.

7. The acousto-optic modulator of claim 1, wherein the first 2D waveguide is configured to guide the beam of light in a first direction and the second 2D waveguide is configured to guide the beam of light in a second direction roughly anti-parallel to the first direction.

8. The acousto-optic modulator of claim 1, wherein the second 2D waveguide comprises at least one section forming an angle with respect to the first 2D waveguide.

9. The acousto-optic modulator of claim 1, further comprising:

a lateral grating, formed on the second 2D waveguide, to couple the beam of light from the slab waveguide into the second 2D waveguide.

10. The acousto-optic modulator of claim 1, further comprising:

a third 2D waveguide formed on the slab waveguide, wherein the refractive index perturbation in the first 2D waveguide couples a backward-traveling beam of light guided by the first 2D waveguide into the third 2D waveguide via the slab waveguide.

11. A method of switching a beam of light guided by a first two-dimensional (2D) waveguide on or adjacent to a slab waveguide into a second 2D waveguide on or adjacent to the slab waveguide, the method comprising:

perturbing a refractive index of the slab waveguide to form a grating;

diffracting the beam of light guided by the first 2D waveguide off the grating into the slab waveguide;

guiding the beam of light to the second 2D waveguide via the slab waveguide; and coupling the beam of light from the slab waveguide to the second 2D waveguide, wherein perturbing the refractive index of the slab waveguide comprises launching a surface acoustic wave along a surface of the slab waveguide toward the first 2D waveguide.

12. The method of claim 11, further comprising:

preventing evanescent coupling between the first 2D waveguide and the second 2D waveguide.

13. The method of claim 11, further comprising:

guiding the beam of light in a first direction via the first 2D waveguide; and guiding the beam of light in a second direction roughly parallel to the first direction with the second 2D waveguide.

14. The method of claim 11, further comprising:

guiding the beam of light in a first direction via the first 2D waveguide; and guiding the beam of light in a second direction roughly anti-parallel to the first direction with the second 2D waveguide.

15. The method of claim 11, wherein coupling the beam of light from the slab waveguide to the second 2D waveguide comprises:

diffracting the beam of light from the slab waveguide into the second 2D waveguide with a lateral grating coupler formed on a side of the second 2D waveguide.

16. The method of claim 11, wherein the beam of light is a first beam of light guided by the first 2D waveguide in a first direction, and further comprising:

guiding a second beam of light in a second direction opposite the first direction via the first 2D waveguide;

diffracting the second beam of light off the grating into the slab waveguide;

guiding the second beam of light to a third 2D waveguide via the slab waveguide; and coupling the second beam of light from the slab waveguide to the third 2D waveguide.

* * * * *